United States Patent
Yoshida et al.

(10) Patent No.: US 6,813,920 B2
(45) Date of Patent: Nov. 9, 2004

(54) METHOD FOR PRODUCING A BUMPER REINFORCEMENT

(75) Inventors: Hiroshi Yoshida, Soja (JP); Hiroshi Goto, Soja (JP); Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 10/459,347

(22) Filed: Jun. 11, 2003

(65) Prior Publication Data

US 2003/0230129 A1 Dec. 18, 2003

(30) Foreign Application Priority Data

Jun. 17, 2002 (JP) ........................................ 2002-175707

(51) Int. Cl.⁷ ................................................ B21D 5/06
(52) U.S. Cl. ........................ 72/166; 72/369; 72/370.01; 29/897.2
(58) Field of Search ........................... 72/166, 170, 172, 72/370.26, 370.01, 369, 307; 29/897.2

(56) References Cited

U.S. PATENT DOCUMENTS

| | | | | |
|---|---|---|---|---|
| 2,792,048 A | * | 5/1957 | Fuchs, Jr. ................... | 72/150 |
| 2,831,523 A | * | 4/1958 | Wurzburger ................. | 72/133 |
| 5,454,504 A | * | 10/1995 | Sturrus ........................ | 228/17 |
| 5,625,948 A | * | 5/1997 | Kuroda et al. ......... | 29/890.149 |
| 5,718,048 A | * | 2/1998 | Horton et al. ............. | 29/897.2 |
| 5,934,544 A | * | 8/1999 | Lee et al. ................... | 228/146 |
| 6,065,211 A | * | 5/2000 | Birkert ....................... | 29/897.2 |
| 6,360,441 B1 | * | 3/2002 | Himsl et al. ............... | 29/897.2 |

FOREIGN PATENT DOCUMENTS

JP           3204635           6/2001

\* cited by examiner

Primary Examiner—Daniel C. Crane
(74) Attorney, Agent, or Firm—Koda & Androlia

(57) ABSTRACT

A method for producing a bumper reinforcement having a hollow and a substantially rectangular cross sectional shape formed by the steps of providing a straight tubular member and forming a curved bumper reinforcement, continuously; wherein angle portions of the straight tubular member having the radius of curvature established in profiling corner portions of an inner die having the radius established in larger than the radius of the corner portions of the outer die are bulged in a range of relief spaces formed between the corresponding corner portions of the inner die and the outer die to prevent generation of the wrinkles particularly on the angle portions of the straight tubular member while being curved.

4 Claims, 12 Drawing Sheets

METHOD FOR PRODUCING A BUMPER REINFORCEMENT

BACKGROUND OF THE INVENTION

1. Field of the Invention

The present invention relates to a method for producing a bumper reinforcement curved in an extending direction.

2. Description of the Related Art

A bumper reinforcement is made of a curved bumper reinforcement having a hollow, substantially rectangular cross section composed of a front face, an upper face, a lower face and a back face. The bumper reinforcement is provided at first as a straight tubular member having a substantially rectangular cross sectional shape constructing a front face, an upper face, a lower face, and a back face. Continuously, this straight tubular member is curved into a curved bumper reinforcement in accordance with the design of a vehicle by performing the front face of the straight tubular member as an outer periphery of the curved bumper reinforcement and by performing the back face of the straight tubular member as an inner periphery of the curved bumper reinforcement. The curved bumper reinforcement obtained is finally cut and separated at a predetermined production length to provide the bumper reinforcement.

This bumper reinforcement absorbs an impact applied to the vehicle bumper utilizing by a plastic deformation of aforementioned faces of the straight tubular member. However, occurrence of partial buckling on those faces while deforming by the impact may cause a serious deterioration of the load absorbing function of the bumper reinforcement for securing the vehicle's safety. Therefore, the individual faces are required to have rigidities in the extending direction to restrain the partial buckling so that they may plastically deform not partially but over a wide range. The rigidities are obtained, as disclosed in Japanese Patent No. 3204635, by constructing a reinforcing rib between the front face and the back face of the bumper reinforcement.

SUMMARY OF THE INVENTION

The straight tubular member is relatively stretched on its front face and compressed on its back face when it is curved for fitting the shape corresponding to the design of the vehicle. The difference of the factor in the stretch and compression between the front face and the back face causes to generate wrinkles mainly on the angle portions formed between the upper face and the back face and between the lower face and the back face. The wrinkles are generated easier by the longer distance between the front face and the back face, i.e., the longitudinal width of the bumper reinforcement, by the smaller radius of curvature Ra of the bumper reinforcement, by the less ductility the plate member constructing the bumper reinforcement, and by the thinner plate member constructing the bumper reinforcement. Additionally, the wrinkles particularly formed on the angle portions between the upper face and the back face and between the lower face and the back face may cause to obstruct for fitting a bumper supporting member to be mounted on the bumper reinforcement.

The bumper reinforcement having the radius of curvature Ra is produced by curving the straight tubular member gradually, while being loaded several times in the curving direction, on the portion which is sandwiched between an inner die, as applied from the inside of the straight tubular member with profiling the cross sectional inside shape of the product, and an outer die, as applied from the outside of the straight tubular member as well as the inner die. Thus, it is conceivable to prevent occurrence of the wrinkles if the inner die and the outer die are brought in close contact with the individual faces of the straight tubular member.

In this method, however, the inner die and the outer die contact only partially with the straight tubular member so that the wrinkles are still generated at the portions which are out of contact with the inner die and the outer die while being loaded. It is also conceivable to restrain occurrence of the wrinkles controlling by that an amount of curvature applied to the straight tubular member at one time is reduced but the number of loading times to the member is increased. In this method, however, the high productivity can not be achieved as a result of deterioration of the production speed. If the number of the loading times applied in constant, on the other hand, the difference in the radius of curvature Ra causes to generate the wrinkles. This means that it is necessary to provide a plurality of additional production facilities for applying a different number of the loading times, in every different radius of curvature Ra required. Therefore, the inventors of the present invention have discussed to provide a production method which can prevent a bumper reinforcement from generation of the wrinkle without deteriorating the production speed, and, which can produce bumper reinforcements having different radius of curvatures Ra in common production facilities.

The bumper reinforcement in the present invention is produced in the following procedure. Specifically, the following procedure shows a method for producing a bumper reinforcement continuously from a curved bumper reinforcement having a hollow, substantially rectangular cross section composed of a front face, an upper face, a lower face and a back face. The production method in the present invention comprises the step of providing a straight tubular member by folding a plate member to construct a front face, an upper face, a lower face and a back face; the step of forming a curved bumper reinforcement, having the front face as an outer periphery of the curvature and the back face as an inner periphery of the curvature, obtained continuously by curving the straight tubular member while being sandwiched between an inner die and an outer die; and the step of cutting the formed curved bumper reinforcement to a predetermined length of the product. Further, in the present invention, corner portions of the inner die located on the side of a back face of the straight tubular member have radius established in larger than the radius of corner portions of the outer die located corresponding individually to the corner portions of the inner die, thereby forming the relief spaces M individually between the inner die and the outer die. Furthermore, the angle portions of the straight tubular member formed between the upper face and the back face and between the lower face and the back face have the radius profiling to the corner portions of the inner die. The method for producing a bumper reinforcement in the present invention is also characterized in that the relief spaces M in the present invention allow bulging of the angle portions of the straight tubular member in a range of the space itself, and thereby prevents generation of wrinkles particularly at the angle portions of the straight tubular member while being curved.

In this production method, the angle portions, as rounded in advance, of the straight tubular member are bulged in the curving procedure thereby to absorb the excess portions of the plate member, as might otherwise cause generation of the wrinkles. Accordingly, the method of the present invention can be applied to the straight tubular member which is formed by an extrusion molding of the light metal (e.g., aluminum or aluminum alloy), or to the straight tubular member which is integrally formed by folding a metal plate member. Moreover, the straight tubular member may have an opened cross sectional structure with an opened back face or a closed cross sectional structure with a closed back face. In the straight tubular member having the opened cross sectional structure, a pair of a rib face folded in or back from the upper face and the lower face is deemed as the back face thereof.

Here, it is advisable that the radius of the individual corner portions located on the side of the back face of the inner die is established in a range of three times to ten times as large as the thickness of the plate member. It is preferable that the radius of the individual angle portions of the inner die is established in a range of four times to six times as large as the thickness of the plate member. In this case, no wrinkle is generated if a range of the radius of curvature is established from 1,000 mm to 10,000 mm. That is, the radius of the angle portions of the straight tubular member is established in a range of about three times to ten times as large as the thickness of the plate member by profiling the corresponding corner portions of the inner die. On the other hand, the radius of the angle portions of the curved bumper reinforcement is to be less than ten times as large as the thickness of the plate member by profiling the corresponding corner portions on the side of the back face of the outer die. If the radius of the individual corner portions on the side of the back face of the inner die is less than three times as large as the thickness of the plate member, a sufficient amount of bulging of the angle portions cannot be secured. This means that it might be caused generation of the wrinkles by the individual corner portions of the outer die allowing a small amount of bulging of the angle portions of the straight tubular member while being curved. If the radius of the individual corner portions of the inner die is more than ten times as large as the thickness of the plate member, on the other hand, the angle portions of the curved bumper reinforcement may be excessively rounded to reduce the flat portion for mounting the bumper supporting member.

For absorbing the excess portions of the plate member causing generation of the wrinkles, it is preferable that the straight tubular member has the larger number of the angle portions rounded in advance. Accordingly, it is advisable that the back face of the straight tubular member having a flat configuration is reconstructed by arranging a concave groove therein into a back face having an irregularity configuration constructing an upper back face, a concave groove, and a lower back face. Additionally, it is also advisable that each of radius established to the corner portions of the inner die is profiled to apply for establishing the radius of the angle portions of the straight tubular member formed at boundary portions between the upper face and the upper back face, between the upper back face and the side surface of the concave groove, between the another side surface of the concave groove and the lower back face, and between the lower back face and the lower face. In other words, the concave groove formed in the back face increases the number of angle portions to absorb the excess portions of the plate member generating the wrinkles. For conveniences, the angle portions as the individual boundary portions formed between the upper face and the upper back face, and between the lower face and the lower back face will be called the "outer angle portion" in the specification. Additionally, the angle portions as the individual boundary portions formed between the upper back face and the side surface of the concave groove, and between the lower back face and the other side surface of the concave groove will be called the "inner angle portion" in the specification.

The concave groove is provided to form the inner angle portions and is advantageous for enhancing the rigidity of the back face structurally. In the straight tubular member having the concave groove, it is also advisable that a reinforcing rib extending from the bottom surface of the concave groove to the front face is formed. At the curving treatment, the inner angle portions absorb the distortion generated by the reinforcement rib obstructing the compression of the back face, and thereby restrain generation of the wrinkles. Moreover, this reinforcing rib being shorter than the upper face and the lower face makes the bumper reinforcement advantageous for strengthening against the buckling.

In the straight tubular member further having a closed cross sectional structure formed by folding the plate member, it may be formed the straight tubular member by; one side edge of the plate member is folded in from the bottom surface of the concave groove to the front face through the angle portion and jointed to the front face to construct the reinforcing rib from the bottom surface of the concave groove to the front face, and the other side edge of the plate member is jointed to the angle portion or the reinforcing rib.

A welded mark jointing the two side edges of the plate member exists on the back face of the straight tubular member having a closed cross sectional structure formed by folding the plate member. These two side edges are welded on the bottom surface of the concave groove so that protrusion of the welded mark from the line linked between the upper back face and the lower back face is avoided. At this time, the two side edges to abut against each other are individually folded in toward the front face and jointed in contact-surface, and the valley formed by folding the two side edges is welded. Moreover, the valley formed by folding the two side edges provides a straight line formed by the folding treatment (especially by a roll-forming treatment). Therefore, it makes possible to use a laser welding treatment with a high welding speed. As a result, it brings speed up of the erosion rate to improve the productivity.

Moreover, in the case that one of the side edges is folded in toward the front face to construct the reinforcing rib, a laser welding treatment with a high welding speed can be utilized in welding the valley formed by folding those two side edges.

DESCRIPTION OF THE PREFERRED EMBODIMENTS

In accordance with the procedure of a production method of a bumper reinforcement in the present invention, here will be described the actions of inner angle portions 20 and outer angle portions 17 at the time of obtaining a curved bumper reinforcement 2 from a straight tubular member 3.

Figure 4:
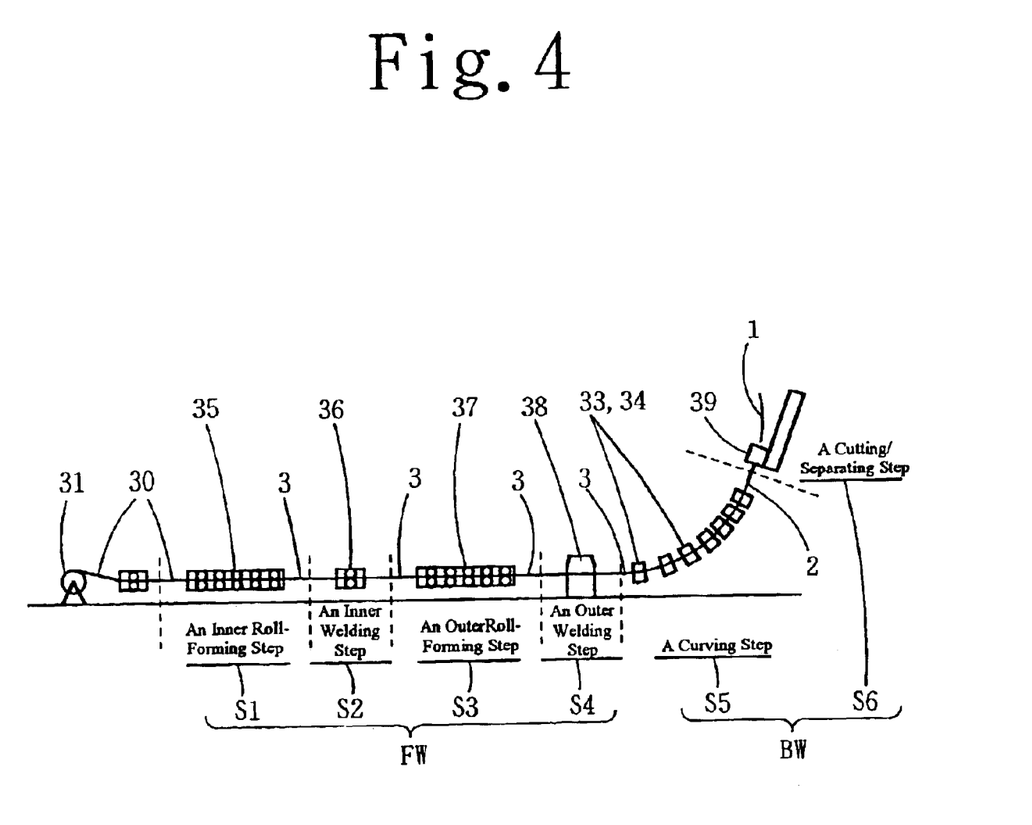
FIG. 4 is a process diagram showing one example of a production line of the bumper reinforcement.

As shown in FIG. 4, a bumper reinforcement 1 of this embodiment is produced by curving the straight tubular member 3, as folded from a plate member 30 to have a closed cross sectional structure, into the curved bumper reinforcement 2 and by cutting/separating the curved bumper reinforcement 2 at each predetermined length. Although not shown in the figures, an auxiliary reinforcement is attached partially or wholly to the front face of the bumper reinforcement.

Figure 1:
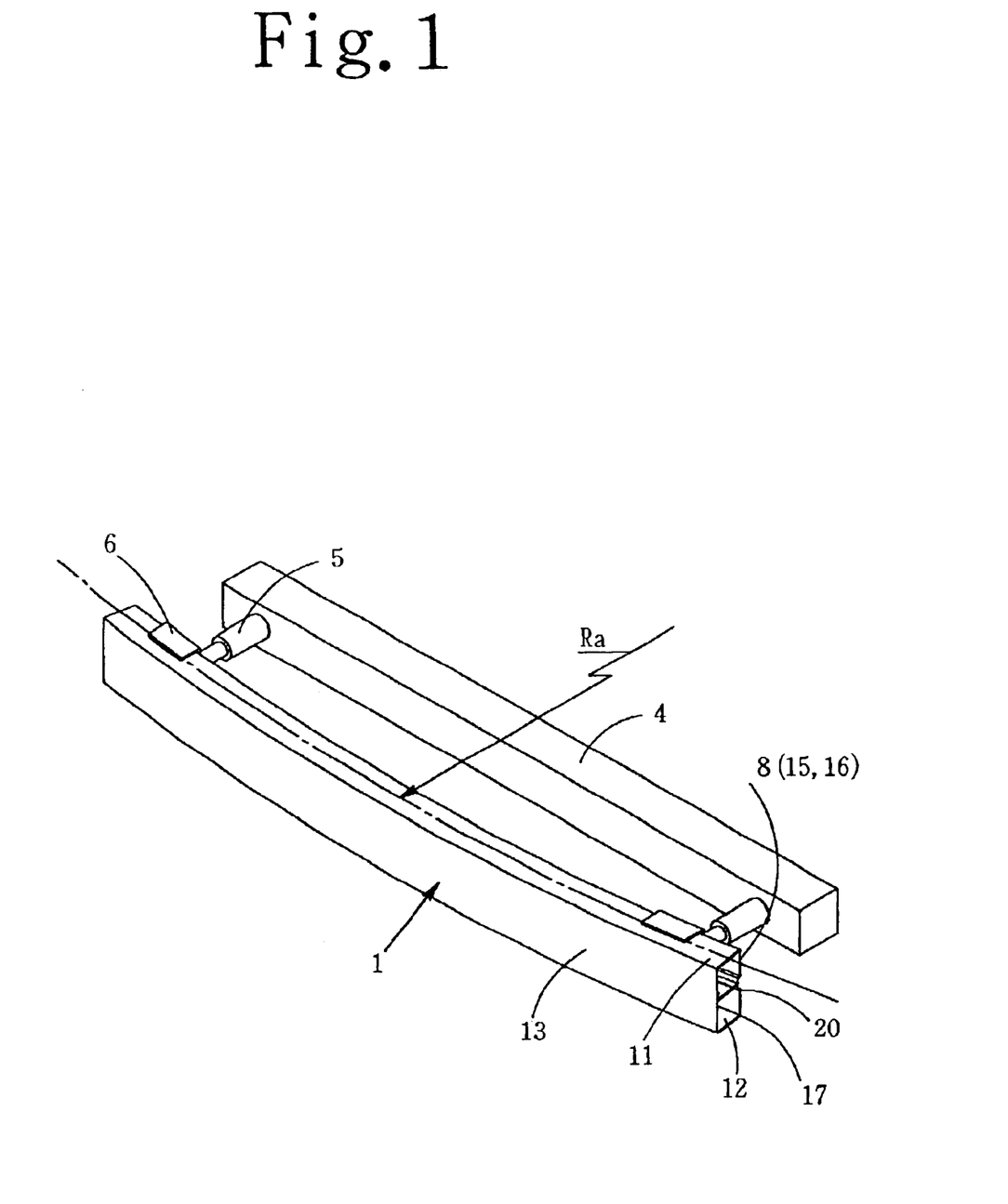
FIG. 1 is a perspective view showing a bumper reinforcement adopting a structure according to the invention.
Figure 2:
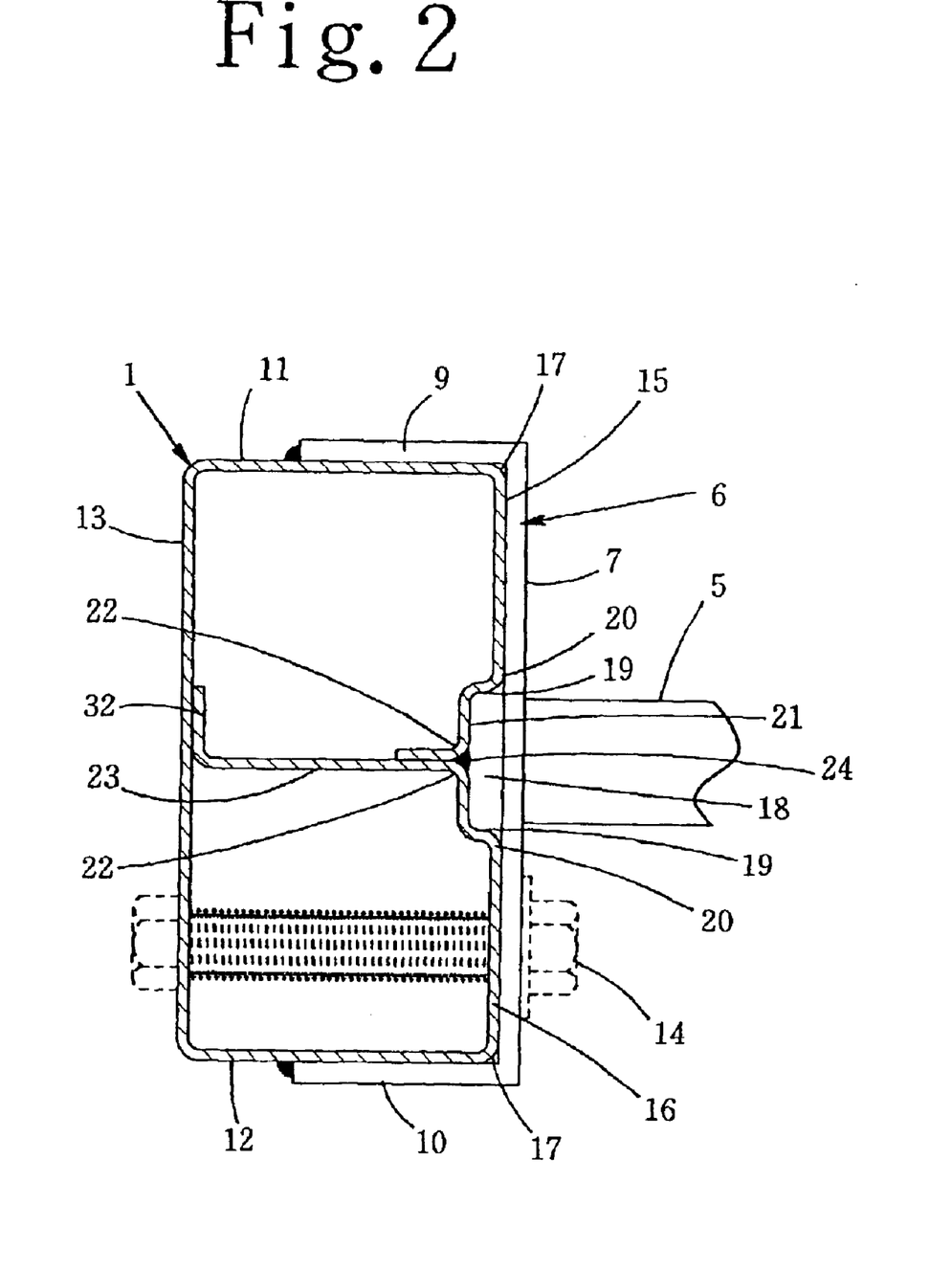
FIG. 2 is a side elevation showing the mounting relations of a bumper connecting member to the bumper reinforcement.

This bumper reinforcement 1 of the invention has such a structure not unlike that of the related art as is connected to a vehicle body member 4 through a bumper supporting member 5, as shown in FIG. 1. Therefore, there is the advantage that the bumper supporting member 5 been currently used is not required its design variation by installing the bumper reinforcement of the invention thereon. As shown in FIG. 2, the bumper supporting member 5 of this embodiment is mounted on the bumper reinforcement 1 by welding individually a vertical supporting face 7 of a bracket 6 attached to the point thereof to a back face 8 (i.e., an upper back face 15 and a lower back face 16) of the bumper reinforcement 1, an upper supporting face 9 of the bracket 6 to an upper face 11 of the bumper reinforcement 1, and a lower supporting face 10 of the bracket 6 to a lower face 12 of the bumper reinforcement 1, or by bolting with a bolt 14 penetrating from the bracket 6 toward a front face 13 of the bumper reinforcement 1 (refer to virtual lines in FIG. 2).

Figure 3:
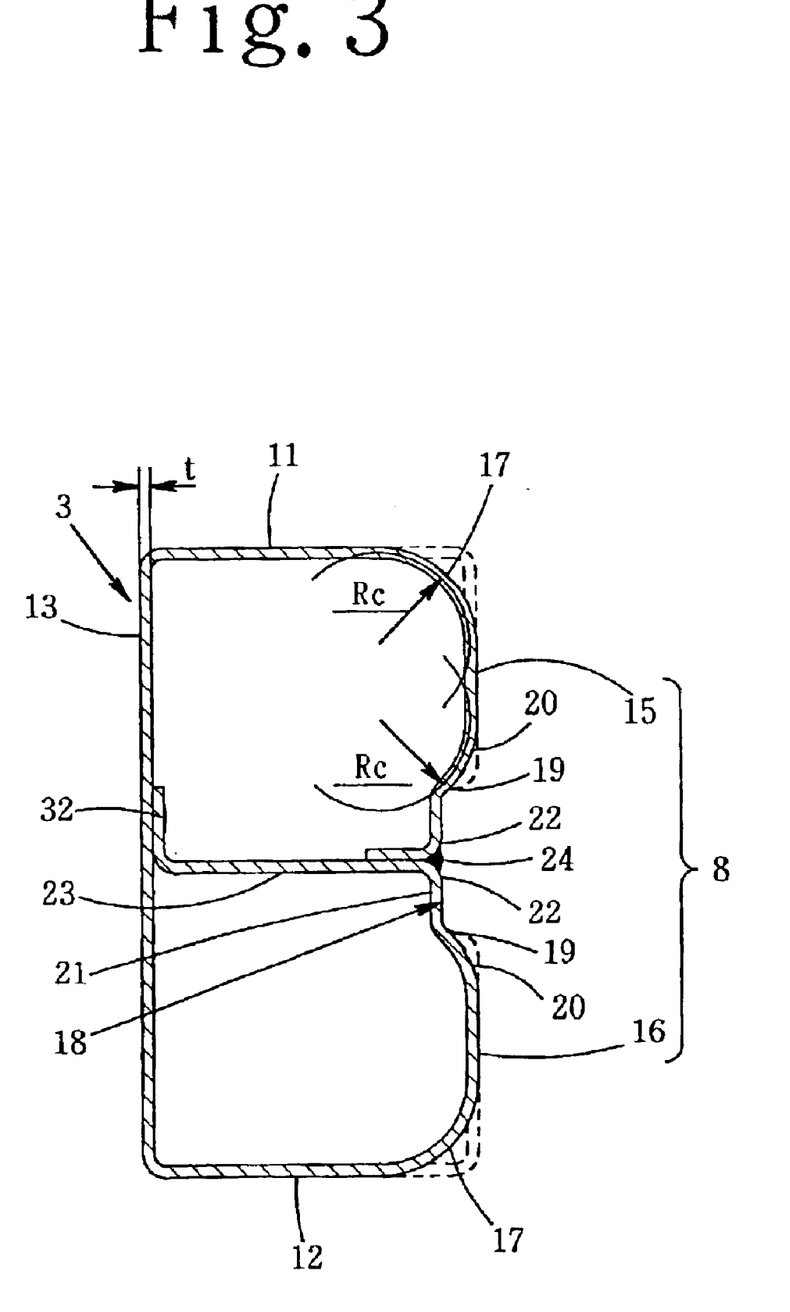
FIG. 3 is a side elevation showing a straight tubular member immediately after roll-formed.

The straight tubular member 3 has a closed cross sectional structure in a shape of a hollowed and a substantially rectangular, which is made by folding a metal plate member so that the front face 13, the upper face 11, the lower face 12, and the back face 8 are formed, as shown in FIG. 3. The back face 8 is divided by a concave groove 18, which is utilized for a structural strengthening, into the upper back face 15 and the lower back face 16. Each of the corner portions formed between the upper face 11 and the upper back face 15, and formed between the lower face 12 and the lower back face 16, provide outer angle portions 17, 17 individually. Moreover, each of the corner portions formed between a side surface 19 of the concave groove 18 and the upper back face 15, and formed between a remaining side surfaces 19 of the concave groove 18 and the lower back face 16, provide inner angle portions 20, 20 individually.

One side edge of the plate member 30 is folded in from the bottom surface 21 of the concave groove 18 through a folded-in edge portion 22 toward the front face 13. This side edge of the plate member 30 is to be jointed to the inner side of the front face 13 so as to construct a reinforcing rib 23, with which the bottom surface 21 of the concave groove 18 and the front face 13 are supported integrally. Moreover, the other side edge of the plate member 30 is folded in through the folded-in edge portion 22 toward the front face 13 and is brought into contact with the reinforcing rib 23. Those two folded-in edge portions 22, 22 are joined by laser-welding at a valley they form (as indicated by a welded mark 24).

Figure 5:
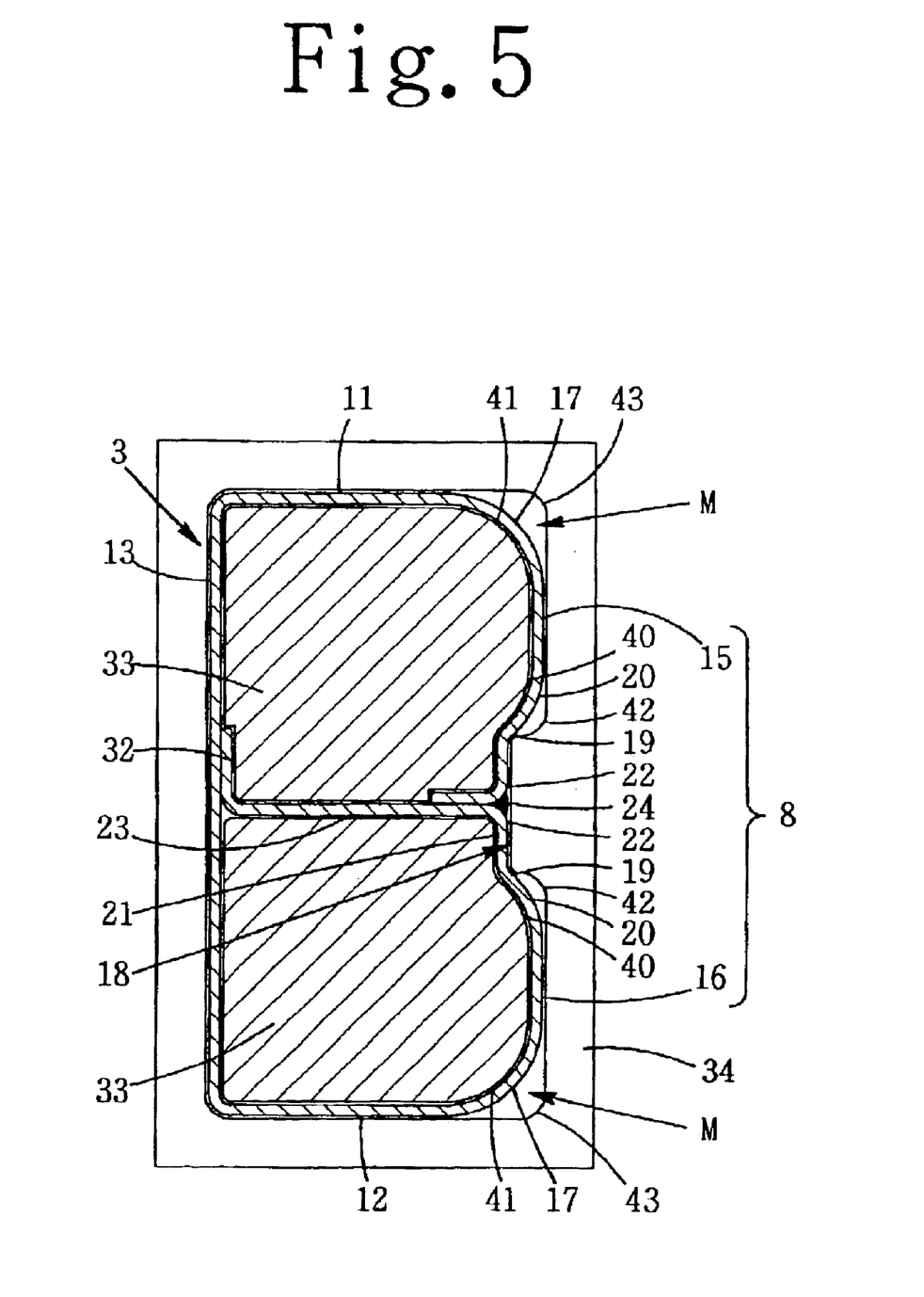
FIG. 5 is a side elevation showing the straight tubular member at the beginning time of a curving treatment.

Each of the inner angle portions 20 and the outer angle portions 17 has a radius of curvature Rc set to five times as large as the thickness t. As shown in FIG. 5, the inner angle portions 20 form along the shapes of inside corner portions 40 of an inner die 33 to obtain relief spaces M for inside corner portions 42 of an outer die 34. Moreover, the outer angle portions 17 form along the shapes of the outside corner portions 41 of the inner die 33 to obtain relief spaces for the outside corner portions 43 of the outer die 34.

In a production line, as shown in FIG. 4, the plate member 30 is let off an uncoiler 31, as located on the left side of the drawing, so that the straight tubular member 3, the curved bumper reinforcement 2, and the bumper reinforcement 1, with facing a front face 13 downward in the drawing, and with facing the back face 8 upward in the drawing, are produced in the recited order.

A first half process FW of the production line includes the steps of an internal roll-forming step S1, an internal welding step S2, an external roll-forming step S3, and an external welding step S4. The process FW forms the straight tubular member 3 from the plate member 30. A latter half process BW of the production line includes the steps of a curving step S5 for forming the curved bumper reinforcement 2 and a cutting/separating step S6 for obtaining the bumper reinforcement 1.

The production line of this embodiment adopts a roll-forming treatment capable of continuously bending in order to improve productivity. At the internal roll-forming step S1, one side edge of the plate member 30, as continuously let off the uncoiler 31, is folded by an internal roll-forming machine 35 to form the reinforcing rib 23 (as referred to FIG. 3) subsequently. At the internal welding step S2, the reinforcing rib 23 is spot-welded to the back side of the front face 13 by a spot-welding machine 36. This welded portion is indicated by a spot-welded mark 32 in FIG. 5 and FIG. 7. At this stage, the concave groove 18 is formed at its half (i.e., the halves of the side surfaces 19 and the bottom surface 21 of the concave groove 18). Next, at the external roll-forming step S3, the other side edge of the plate member 30 is folded by an external roll-forming machine 37 along the folded-in edge portion 22 at the previously formed the bottom surface 21 of the concave groove 18 and is brought into contact with the reinforcing rib 23. At the external welding step S4, moreover, the valley formed between the folded-in edge portions 22, 22 is laser-welded by a laser-welding machine 38 to complete the straight tubular member 3.

Subsequently, at the subsequent curving step S5, the inner die 33 and the outer die 34 are intermittently applied to the straight tubular member 3, and this straight tubular member 3 is curved by applying a load little by little in the curving direction thereby to provide the curved bumper reinforcement 2. At the last separating step S6, moreover, the curved bumper reinforcement 2 is cut and separated to each predetermined length by a cutting/separating machine 39 thereby to produce the bumper reinforcement 1.

FIG. 5 shows a cross sectional structure of the straight tubular member 3 at an early stage of the curving step S5. At this stage, the straight tubular member 3 is installed between the inner die 33 applied relatively to the individual faces 13, 11, 12, 15, and 16 from inside of the straight tubular member 3 and the outer die 34 applied relatively to the individual faces from outside of the straight tubular member 3. The cross sections of the inner die 33 and the outer die 34 are shaped to profile the angle portions or edge portions excepting the inner angle portions 20 and the outer angle portions 17 and to contact with the individual faces 13, 11, 12, 15 and 16 of the straight tubular member 3. Of the inner die 33, specifically, the inside corner portions 40 and the outside corner portions 41, as profiling the cross sectional shapes of the inner angle portions 20 and the outer angle portions 17, are applied from the inner side of the straight tubular member 3. The inside corner portions 40 and the outside corner portions 41 have the radius of curvature established in five times as large as the wall thickness t of the straight tubular member 3 (as referred to FIG. 3). On the other hand, the outer die 34 has the inside corner portions 42 and the outside corner portions 43 profiling the cross sectional shape of the product, to obtain the relief spaces M formed between the inside/outside corner portions of the outer die and the inner/outer angle portions 20, 17 of the straight tubular member 3. The radius of curvature of the inside corner portions 42 and the outside corner portions 43 of the outer die in this embodiment are established in two times as large as the wall thickness t of the straight tubular member 3. Thus, the relief spaces M are formed between the inner angle portions 20 and the inside corner portions 42, and between the outer angle portions 17 and the outside corner portions 43.

Figure 6:
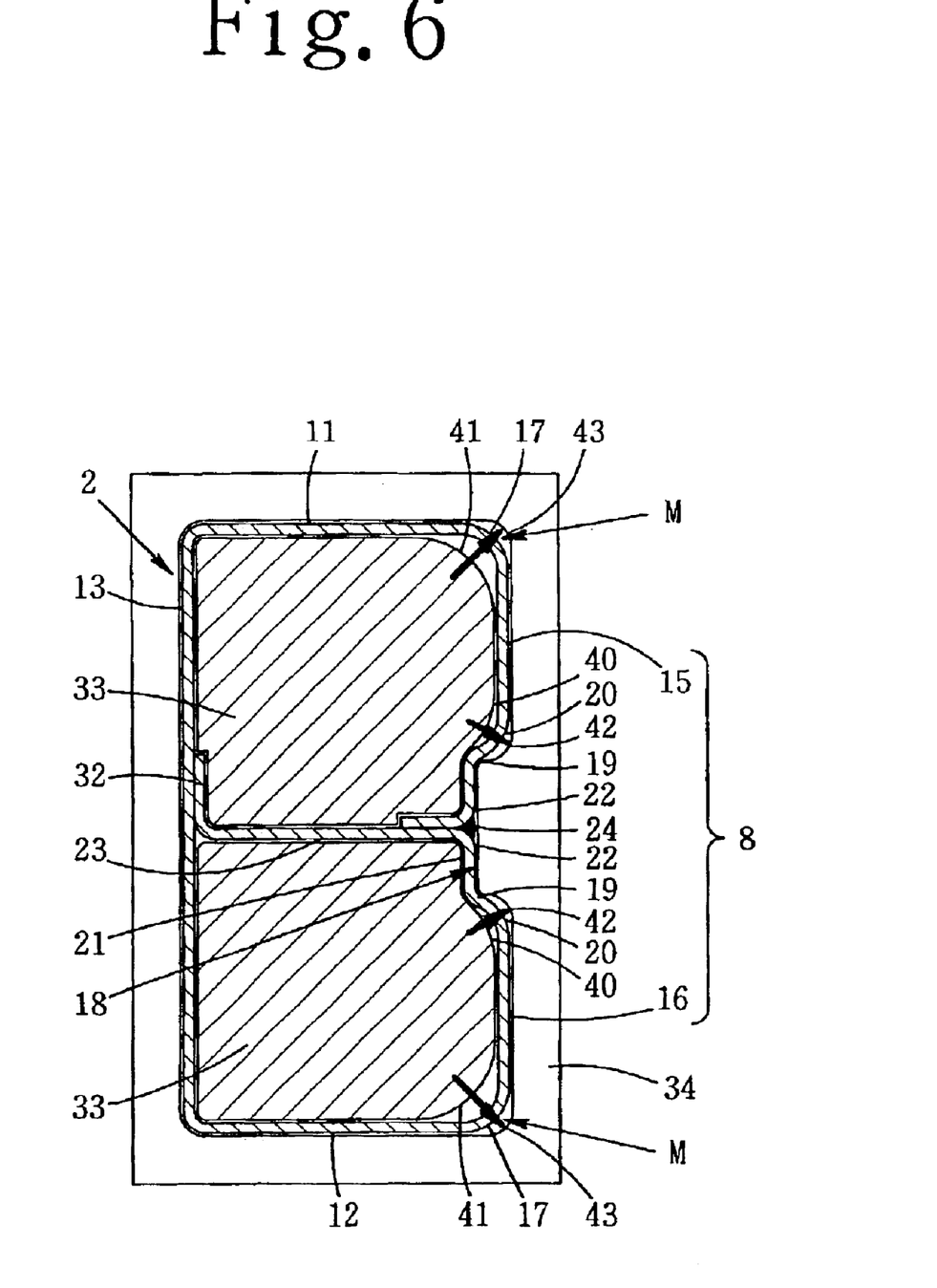
FIG. 6 is a side elevation showing the straight tubular member during the curving treatment.

The straight tubular member 3 is curved by degrees while being gradually loaded in which are intermittently sandwiched by the inner die 33 and the outer die 34. By this curving treatment, the front face 13 is stretched relatively in direction of the production length, in contrast thereto, the upper back faces 15 and the lower back face 16 are relatively compressed. This causes that excess portions are arisen individually on the upper face 11, the lower face 12, the upper back face 15, and the lower back face 16. At this time, the relief spaces M exist only for the inner angle portions 20 and the outer angle portions 17 so that the aforementioned excess portions are so absorbed as to bulge into the relief spaces M, as shown in FIG. 6. The excess portions bulge without any resistance into the relief spaces M so that the curved bumper reinforcement 2 can make the upper face 11, the lower face 12, the upper back face 15, and the lower back face 16 flat without any wrinkle. Thus, the bumper reinforcement 1 having a curving shape without wrinkle can be obtained by cutting/separating the curved bumper reinforcement 2 produced in aforementioned line. The bumper reinforcement 1 prevents partial buckling caused by the wrinkles and thereby performs a high shock absorption.

Figure 7:
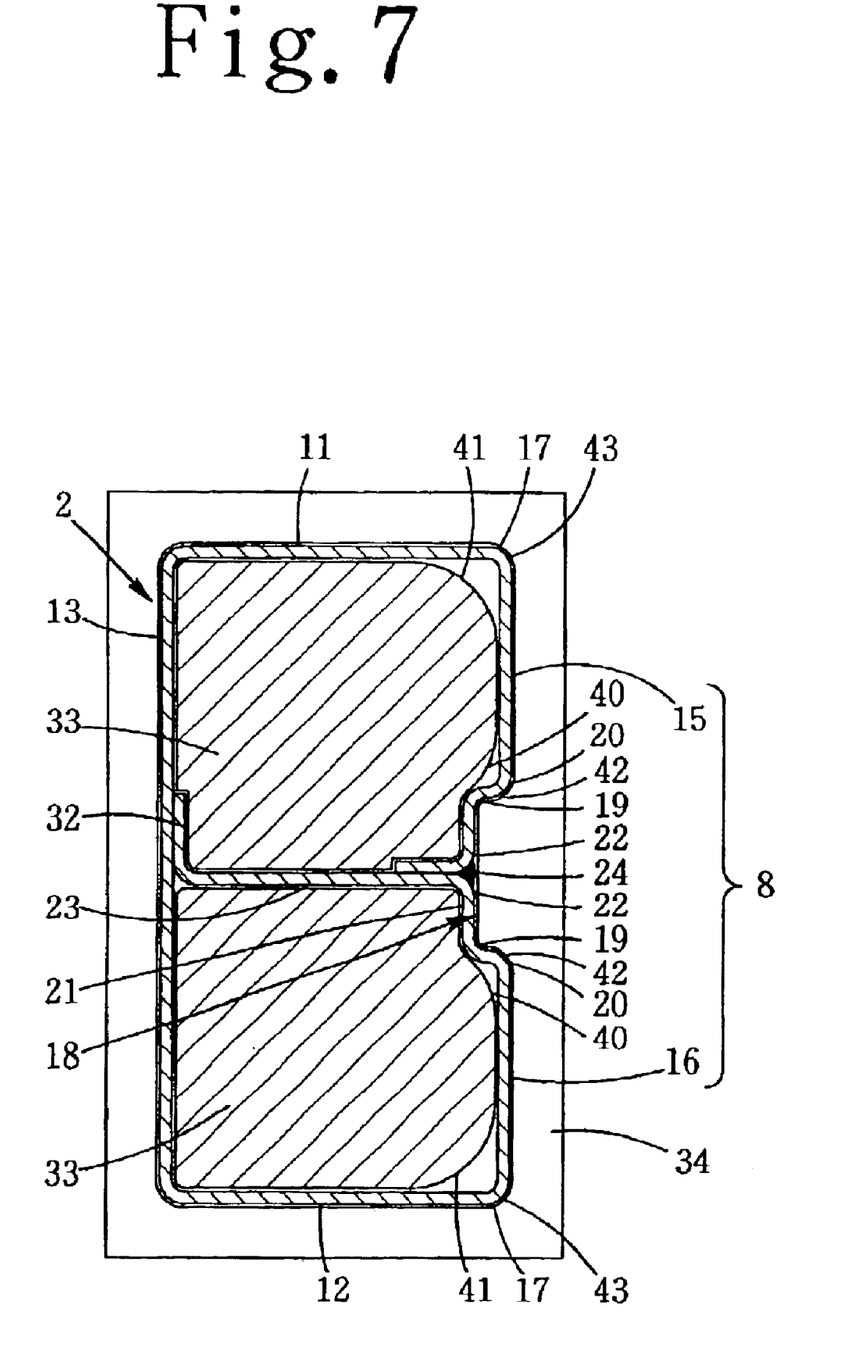
FIG. 7 is a side elevation showing the bumper reinforcement after finished of the curving treatment.

The inner angle portions 20 and the outer angle portions 17 of the straight tubular member 3 are bulged so far as the ranges of the relief spaces M to produce the curved bumper reinforcement 2 having the product cross section, as shown in FIG. 7. As a matter of fact, the inner angle portions 20 and outer angle portions 17 of the straight tubular member 3 are individually bulged, not in equivalent, toward the inside corner portions 42 and the outside corner portions 43 of the outer die 34 in the limit to allow their bulging, by combinations of the radius of curvature Ra of the bumper reinforcement 1 and the radius Rc of the inner angle portions 20 and the outer angle portions 17 of the straight tubular member 3. Accordingly, it appears that the extents of the inner/outer angle portions bulging are partially different in the extending direction of the bumper reinforcement 1.

However, it is important that the individual inner angle portions 20 and outer angle portions 17 in the curved bumper reinforcement 2 are not allowed to bulge over the aforementioned bulging limits. Therefore, it is not a problem if the bulging extents are partially different.

As far as the radius Rc of the inner angle portions 20 and the outer angle portions 17 of the straight tubular member 3 is within a range of three times to ten times as large as the thickness t and so far as the radius of curvature Ra of the curved bumper reinforcement 2 is within a range of 1,000 to 10,000 mm, according to the invention, the excess portions accompanying the curving treatment are absorbed by the bulges of the individual inner angle portions 20 and outer angle portions 17 thereby to keep the sufficient flat portions on the back face 8 of the bumper reinforcement 1. This structure makes it possible to bring the bracket 6 into close contact with the back face 8 and to insert and fasten the bolt reliably. This means that no apprehension of the wrinkles is involved in the bumper reinforcement 1 produced, even if the straight tubular member 3 is formed to have the radius Rc of the inner angle portions 20 and the outer angle portions 17 and if the straight tubular member 3 is then curved with the different radius of curvature Ra set for every types of the car. According to the invention, therefore, it is possible to produce many kinds of bumper reinforcements in a small lot on the common production line.

Figure 8:
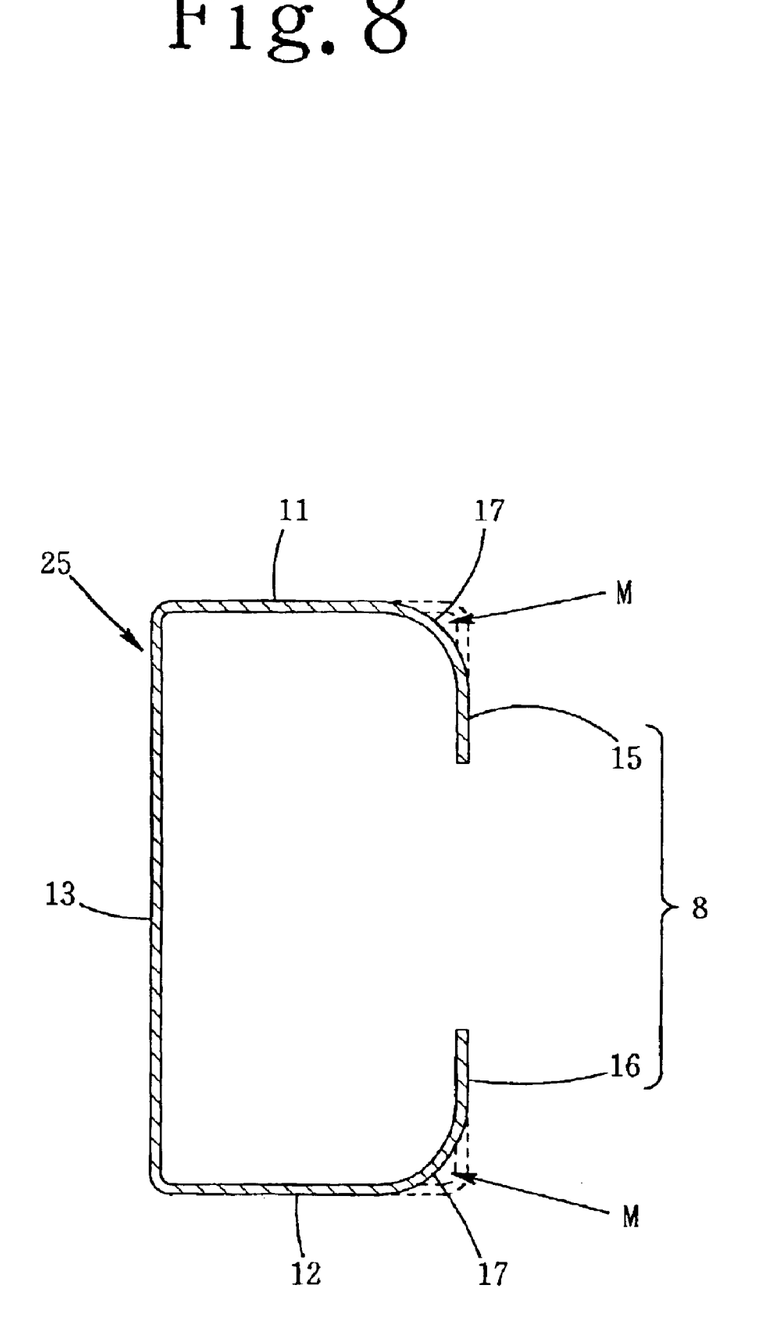
FIG. 8 is a side elevation of a straight tubular member of another embodiment.
Figure 9:
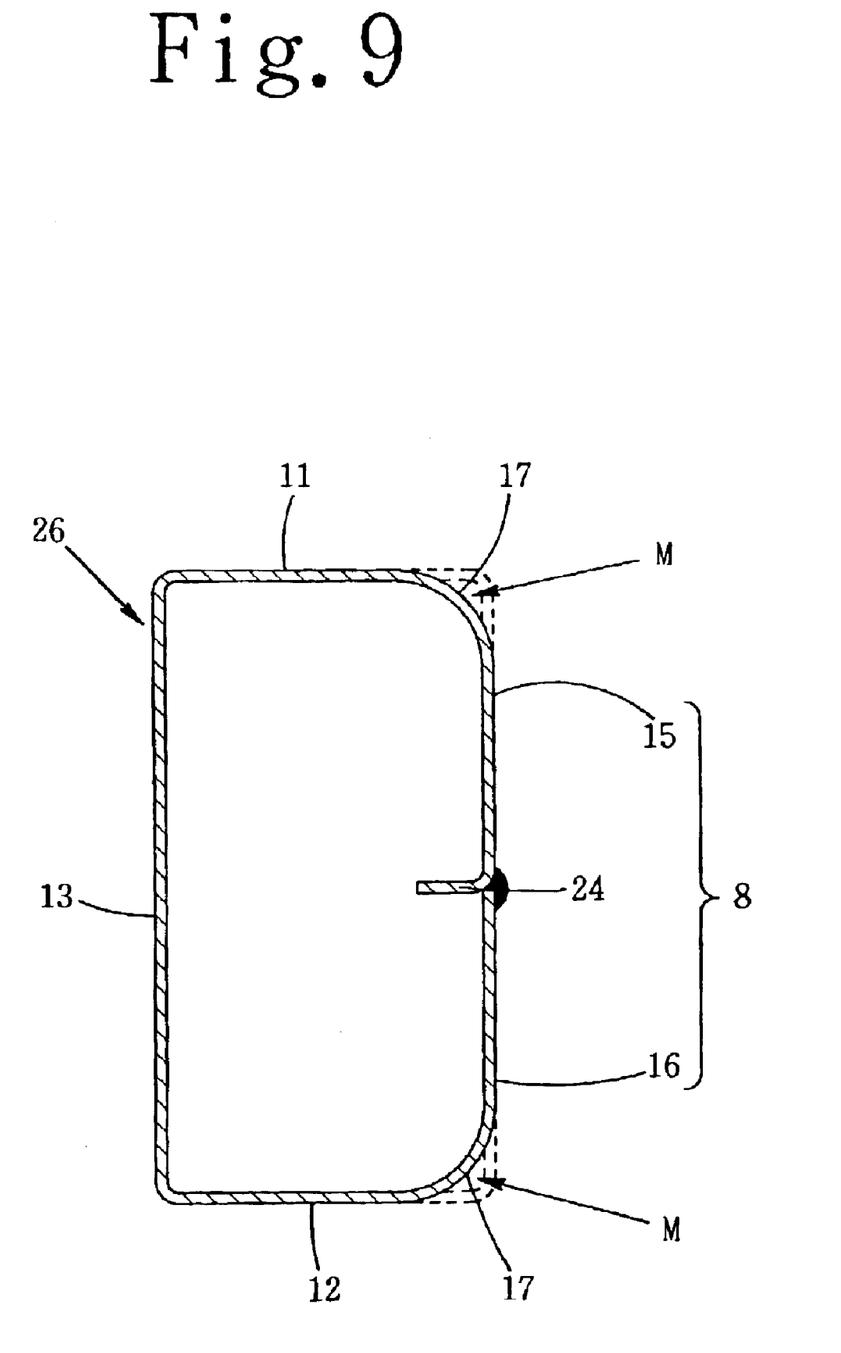
FIG. 9 is a side elevation of a straight tubular member of another embodiment.
Figure 10:
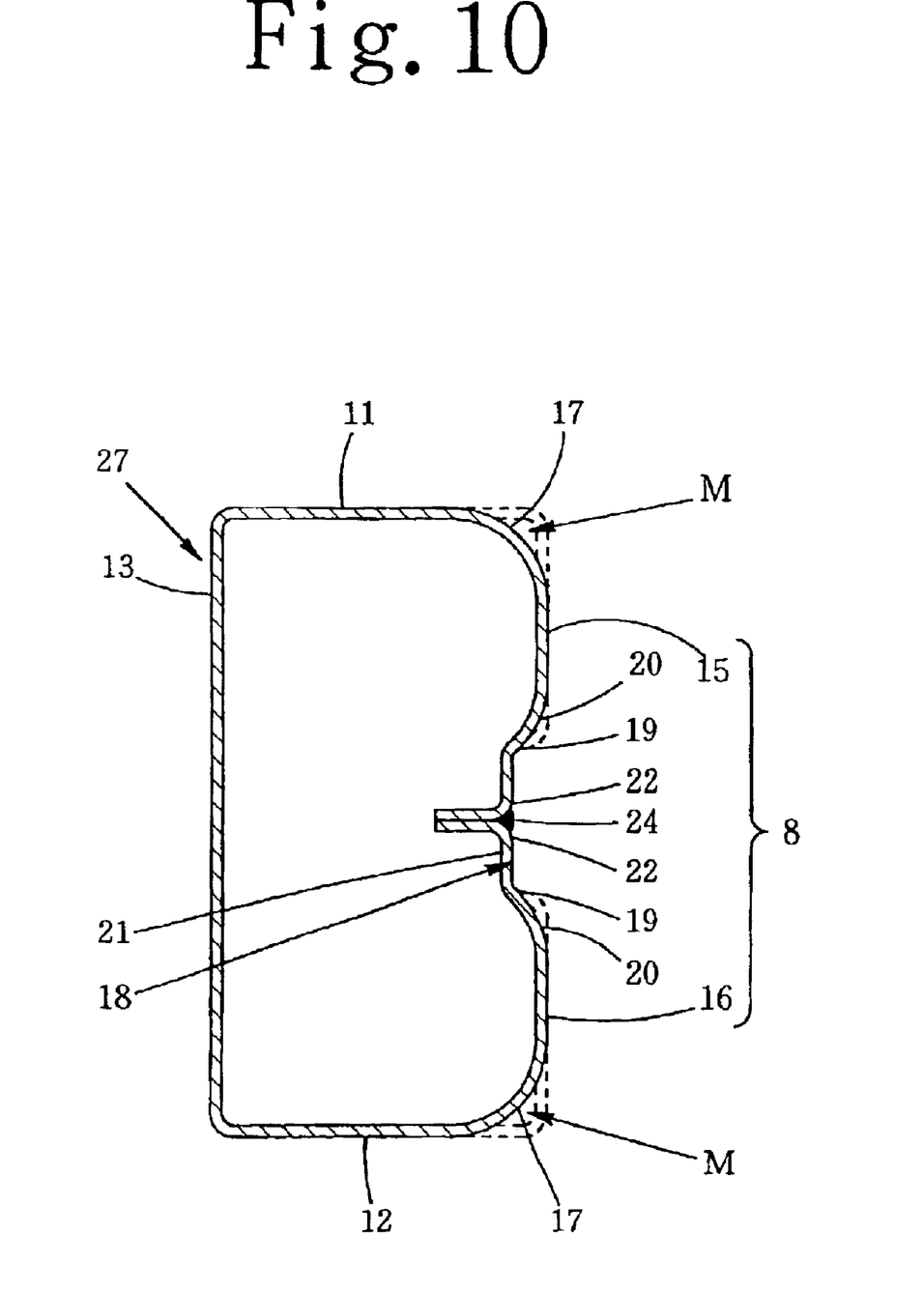
FIG. 10 is a side elevation of a straight tubular member of another embodiment.

The present invention can be applied not only to the embodiment thus far described but also to a variety of bumper reinforcements of the related art. For example, the present invention can also be applied to the productions of a bumper reinforcement 25 having an opened cross sectional structure, as shown in FIG. 8, and a bumper reinforcement 26 having a simple a closed cross sectional structure, as shown in FIG. 9. As shown in FIG. 10, moreover, the invention can also be applied to a bumper reinforcement 27 having a closed cross sectional structure provided with not the reinforcing rib but only the concave groove 18.

Figure 11:
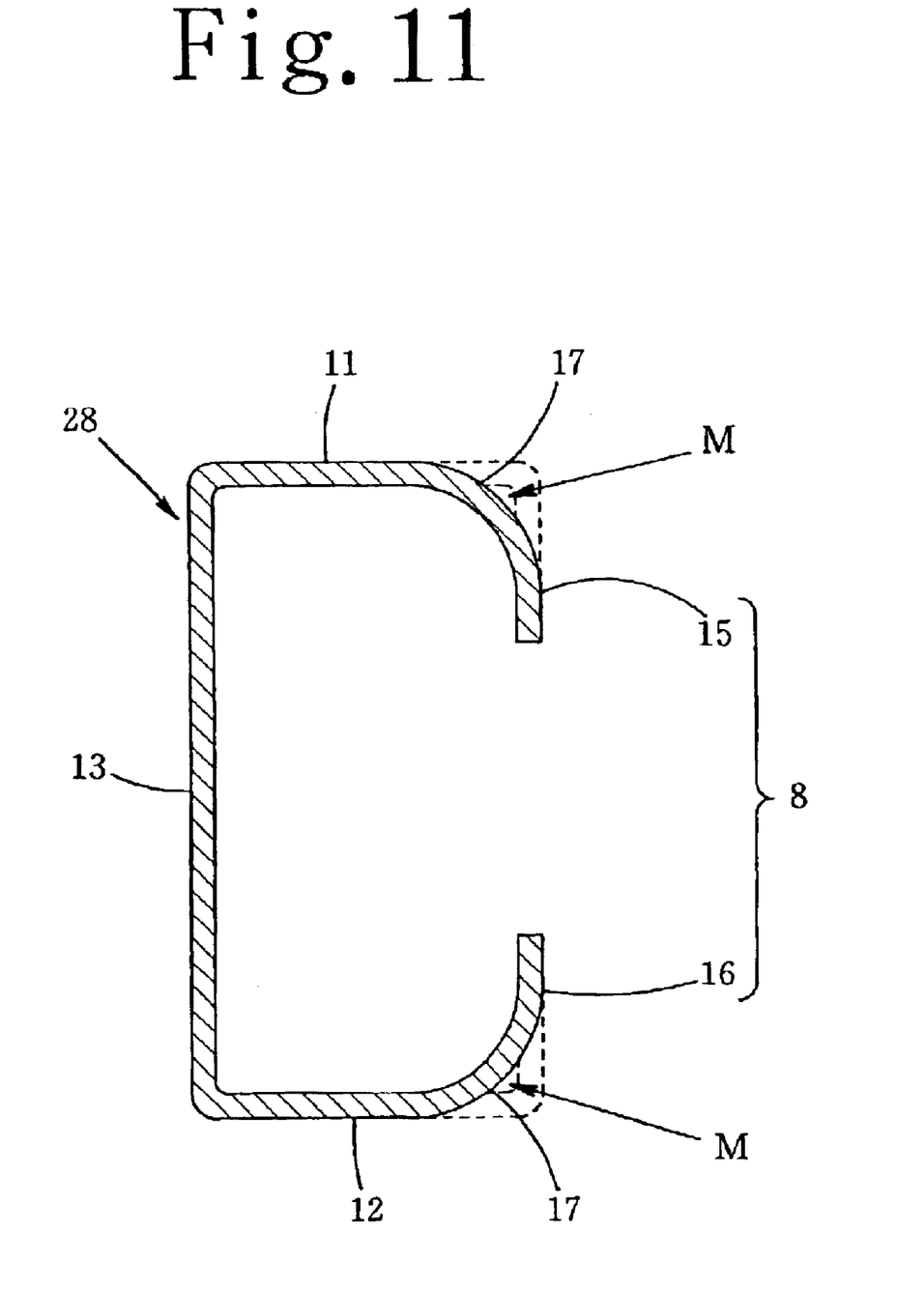
FIG. 11 is a side elevation of a straight tubular member of another embodiment.
Figure 12:
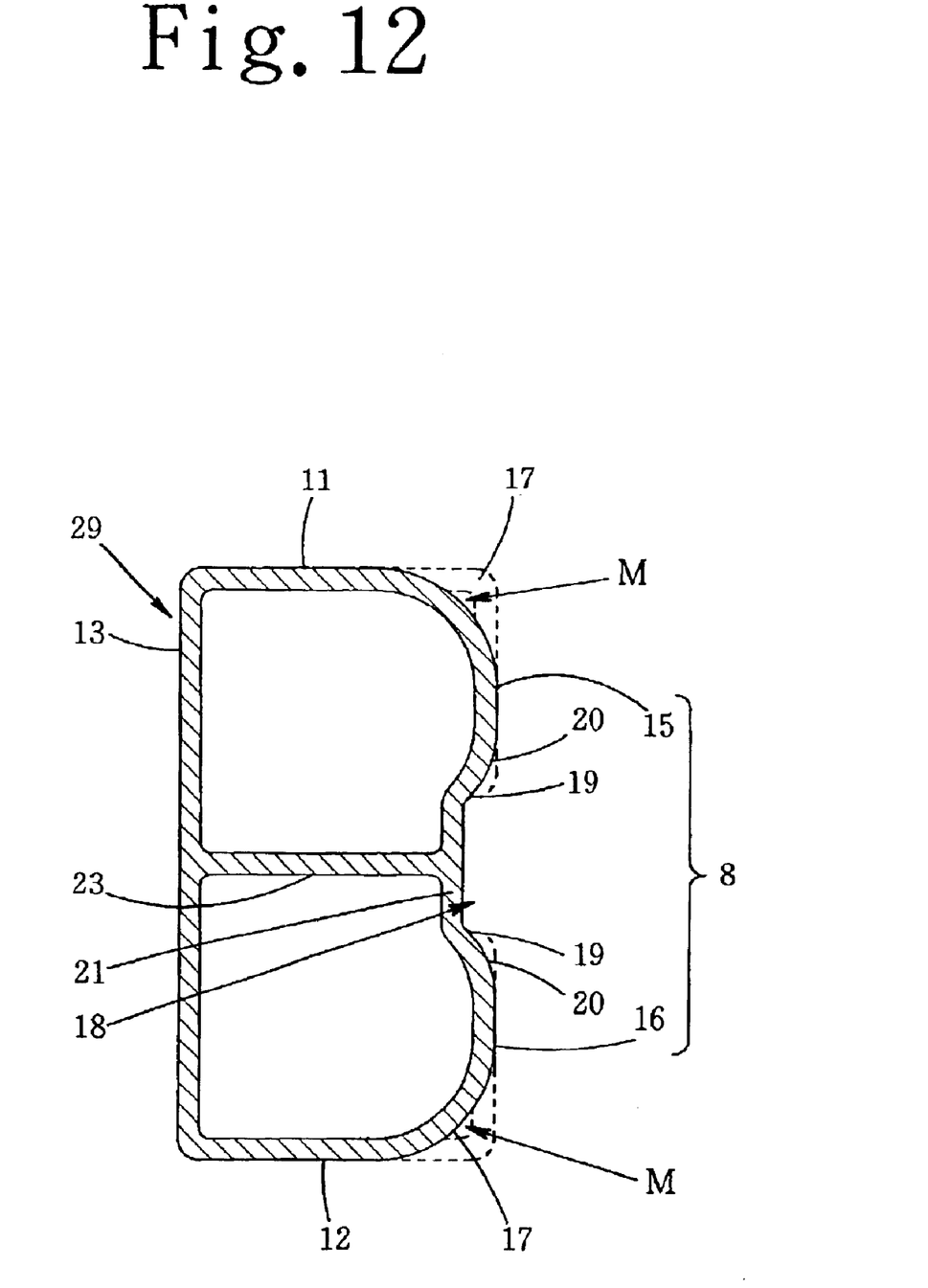
FIG. 12 is a side elevation of a straight tubular member of another embodiment.

Moreover, the invention can also be applied to a bumper reinforcement 28 having an opened cross sectional structure made by extrusion-molding of aluminum or aluminum, as shown in FIG. 11, and to a bumper reinforcement 29 having a closed cross sectional structure made by extrusion-molding the same, as shown in FIG. 12. In addition, not shown in the figures, the invention can also be applied for producing of an auxiliary reinforcement mounted to the bumper reinforcement.

The method of the invention for producing the bumper reinforcement can prevent the upper face, the lower face, or the back face of the curved member from being wrinkled when the straight tubular member is formed into the curved member. As a result, the bumper connecting member can be mounted in close contact on the back face of the bumper reinforcement thereby to enhance the degree of freedom for the mounting method, as has been described hereinbefore. It is also possible to prevent the buckling or the partial deformation, as might otherwise be caused by the wrinkles, of the bumper reinforcement. Moreover, the individual inner and outer angle portions are bulged in smooth deformations so that the impact applied to the bumper reinforcement can be smoothly dispersed to a wide range thereby to exhibit a high shock absorbing performance.

In case the concave groove to form more angle portions is formed in the back face of the straight tubular member, moreover, the concave groove acts to enhance the rigidity in the back face of the bumper reinforcement. The concave groove has further an advantage that it can prevent the welded mark from protruding on the bumper reinforcement having the closed cross sectional structure formed by folding a plate member. Furthermore, the concave groove has an advantage that improvement of the productivity can be achieved by a high speed welding utilizing the laser welding treatment to bury the valley formed between the two folded-in edge portions folded each of the two side edges of the plate member toward the front face of the bumper reinforcement.

What is claimed is:

1. A method for producing a bumper reinforcement, comprising the steps of:

providing a straight tubular member having a substantially rectangular cross sectional shape, forming a curved bumper reinforcement obtained continuously by curving the straight tubular member while being sandwiched between an inner die and an outer die; wherein the inner die and outer die have corner portions with;

corner portions of the inner die located on the side of a back face of the straight tubular member having a radius established in a range of three to ten times as large as a wall thickness of the straight tubular member, corner portions of the outer die located corresponding individually to the corner portions of the inner die having a radius established less than the radius of the corn portions of the inner die, thereby forming relief spaces individually between the inner die and the outer die; and forming angle portions of the straight tubular member between an upper face and the back face and between a lower face and the back face having a radius profiling to the corner portions of the inner die, and bulging the angle portions of the straight tubular member into the relief spaces in a range thereof while being curved thereby preventing generation of wrinkles on the angle portions of the straight tubular member.

2. A method for producing a bumper reinforcement according to claim 1, wherein the straight tubular member is integrally formed by folding a plate member to construct a front face, the upper face, the lower face and the back face thereof.

3. A method for producing a bumper reinforcement according to claim 1, wherein the straight tubular member is formed by an extrusion molding.

4. A method for producing a bumper reinforcement according to claim 1, wherein the back face of the straight tubular member is constructed by an upper back face, a concave groove, and a lower back face, and angle portions of the straight tubular member formed between the upper back face and a side surface of the concave groove and between the lower back face and another side surface of the concave groove have a radius profiling to the corresponding corner portions of the inner die.

* * * * *